Figure 1:
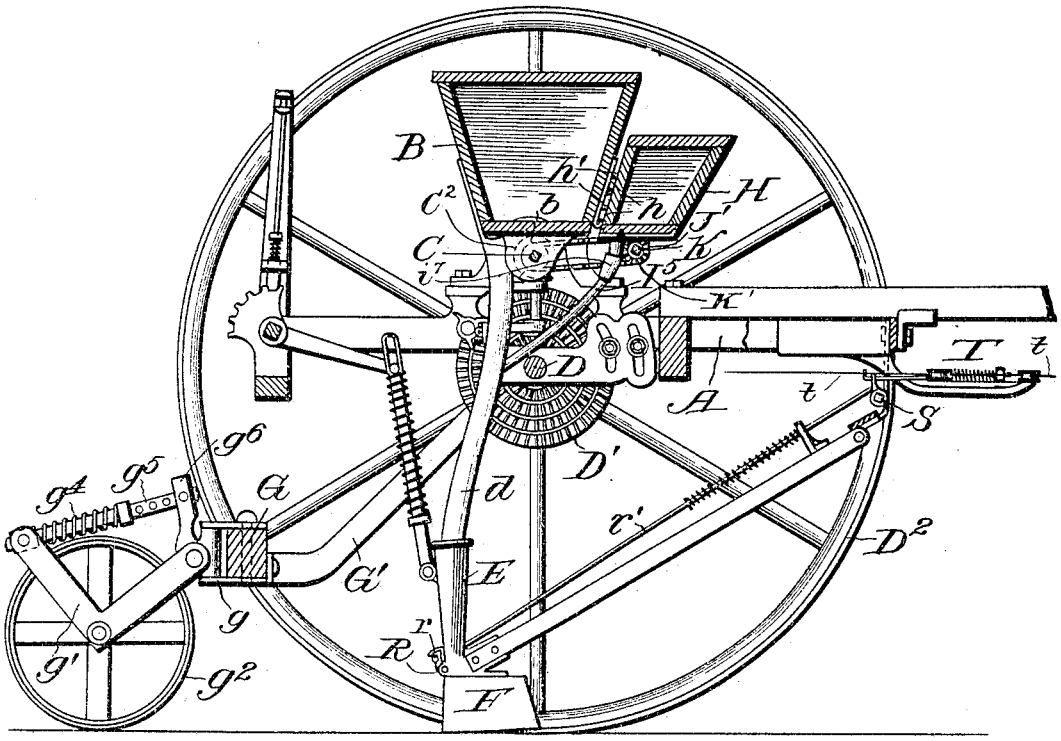

No. 788,036. PATENTED APR. 25, 1905.
W. FETZER.
GRAIN DRILL.
APPLICATION FILED SEPT. 1, 1904.

3 SHEETS—SHEET 1.

WITNESSES:
C. H. Walker.
James B. Mansfield

INVENTOR
William Fetzer
BY
Alexander &
Towell Attorneys.

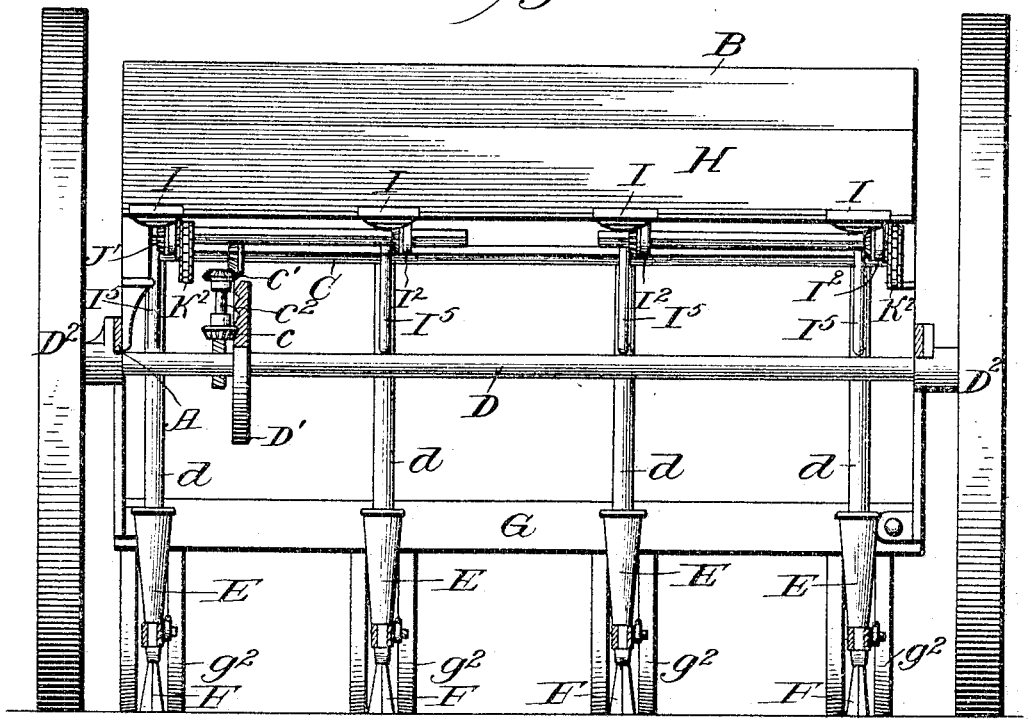
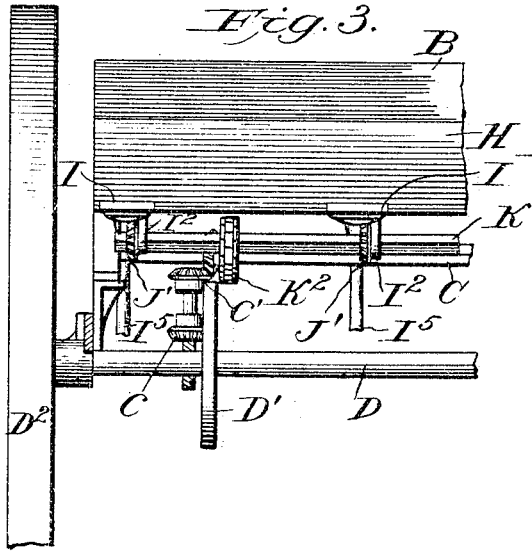
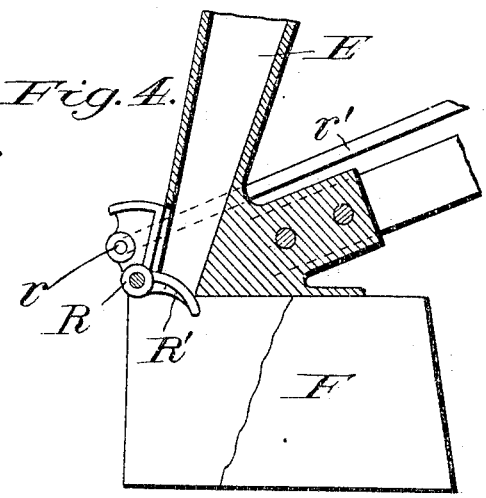

No. 788,036. PATENTED APR. 25, 1905.
W. FETZER.
GRAIN DRILL.
APPLICATION FILED SEPT. 1, 1904.
3 SHEETS—SHEET 3.
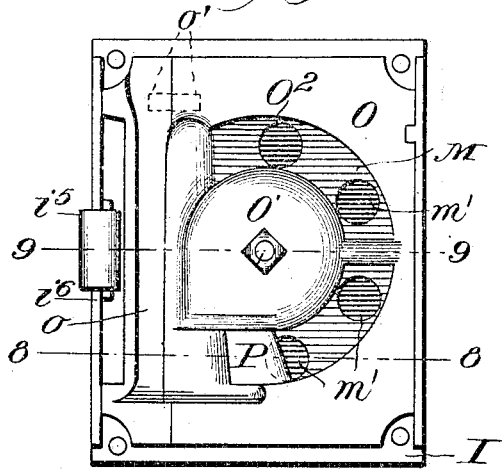
Fig. 6.
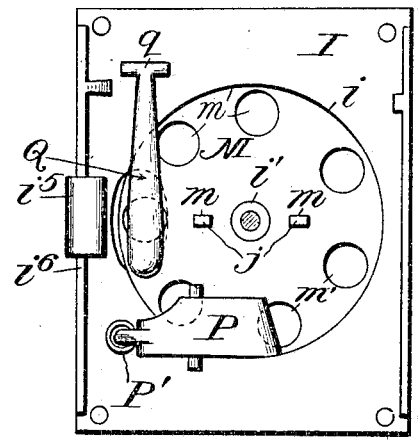
Fig. 7.
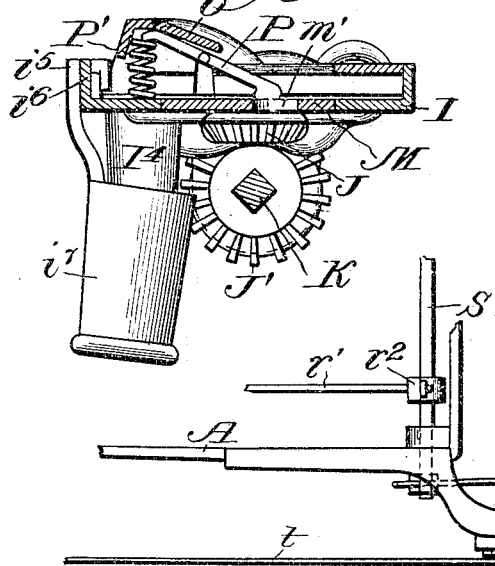
Fig. 8.
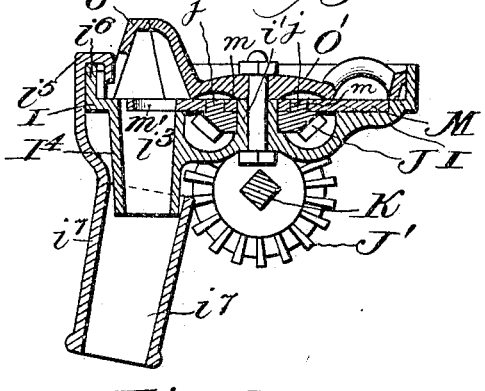
Fig. 9.
Fig. 10.
Fig. 11.
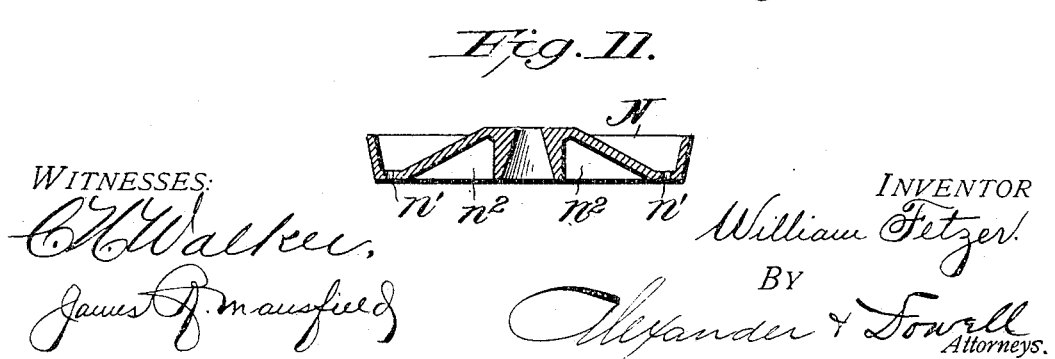
WITNESSES:
C. H. Walker,
James R. Mansfield
INVENTOR
William Fetzer,
BY
Alexander & Dowell
Attorneys.

No. 788,036.

Patented April 25, 1905.

UNITED STATES PATENT OFFICE.

WILLIAM FETZER, OF MIDDLETOWN, OHIO.

GRAIN-DRILL.

SPECIFICATION forming part of Letters Patent No. 788,036, dated April 25, 1905.

Application filed September 1, 1904. Serial No. 222,965.

*To all whom it may concern:*

Be it known that I, WILLIAM FETZER, of Middletown, in the county of Butler and State of Ohio, have invented certain new and useful Improvements in Grain-Drills; and I hereby declare that the following is a full, clear, and exact description thereof, reference being had to the accompanying drawings, which form part of this specification.

This invention relates to an improvement in grain-drilling machines, or what are commonly known as "grain-drills;" and it is embodied in the construction presently to be described, and defined in the claims.

The object of the present invention is the provision of a grain-drill having improved means whereby the same can be used for the usual purposes of drilling grain as well as for the purpose of planting as distinguished from drilling seeds or grain.

With this end in view the invention may be briefly stated as consisting of a grain-drill having a supplemental or added planting attachment comprising a series of independent feeds, said drill as a whole being susceptible of operation independent of the planter, and vice versa, or the two being arranged for simultaneous use. However, the invention relates more particularly to the combination of a grain-drill and a planter.

In this specification where the term "planter" is employed it is to be understood that the term is used to define a structure wherein the grain or seeds are in themselves planted as distinguished from those constructions wherein material is drilled or sown.

Heretofore it has been customary to associate with grain-drills grass-seed feeders employing therein a supplemental hopper for containing the grass-seed and also a construction for feeding and supplying fertilizer to the rows being drilled. In such structures generally the seed is fed directly into the open cut or furrow either with or in advance of the discharge of the seed from the drill. Such construction, however, is wholly foreign to the present invention in that the present invention comprehends a structure wherein the planting of corn or other seed which is usually planted in hills and which is designed to be planted independently of the seed from the grain-drill can be successfully accomplished.

The invention embodies a preferably detachable supplementary hopper which may be fastened to the main hopper or framework of an ordinary grain drill or planter; also, novel grain selective or separating mechanism in such supplementary hopper; also, novel means for variably driving the feeding devices of the supplementary hopper from the main feed-shaft of the drilling-machine. These devices are preferably such that each supplementary feed may be driven by individual gearing, and the gearing is such that the number of seed discharged in a given time or for a given length of travel of the machine is variable within large limits.

By my invention a great variety of grains or seeds may be properly sown in certain spaced rows and at properly-spaced intervals for such seed in the rows. Means are also provided whereby, if desired, the seed may be retained in the boot until a suitable number for a hill is collected and then simultaneously deposited. Thus by means of my invention one machine, an ordinary drill, may be readily adapted to sow accurately and speedily a large variety of seeds, with practically no changes required except in the speed of the gearing, and in sowing small garden-seed a bowl-shaped feed plate or ring may be used, while for planting other classes of seed a circular flat seed plate or ring may be used.

In the accompanying drawings I have illustrated an ordinary drilling-machine to which my improvements are attached, and I will now proceed to describe the improvements in detail, explaining the same as particularly adapted to sow corn in proper rows, and refer to the claims following the description for summaries of the features of my invention for which I desire protection.

Figure 5:
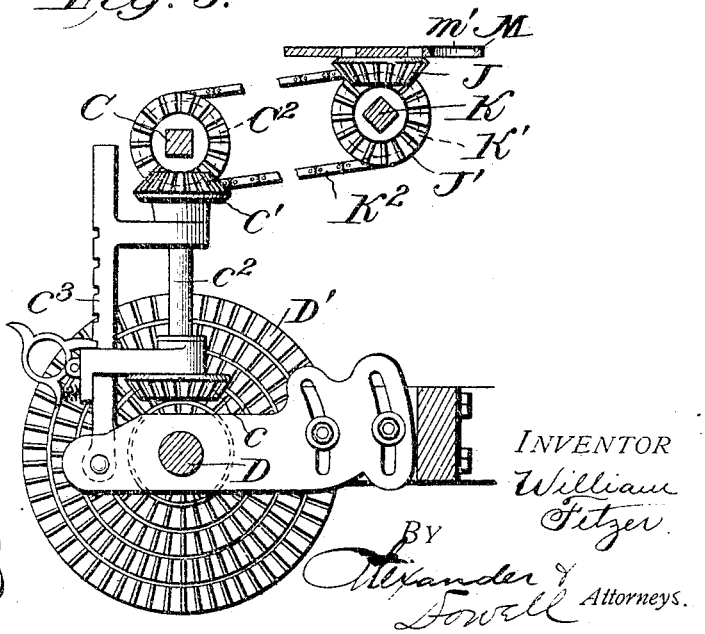

Figure 1 is a longitudinal sectional elevation of a grain-drill with my improvements applied thereto. Fig. 2 is a front view thereof with frame broken away. Fig. 3 is a detail showing a slight modification of the feed-drive. Fig. 4 is a sectional detail of the cut-off or valve at bottom of seed-boot. Fig. 5 is a detail view of the feed-driving mechanism. Fig. 6 is an enlarged plan view of one of the feed devices of the supplementary hopper. Fig. 7 is a similar view with top casting removed. Fig. 8 is a section on line 8 8, Fig. 6. Fig. 9 is a section on line 9 9, Fig. 6. Fig. 10 is a detail view of the check-rower attachment. Fig. 11 is a detail sectional view of the bowl-shaped feed-plate.

In the drawings, A is the main frame of an ordinary drilling-machine, which is provided with a hopper having the usual seed-cups and seeding or feeding devices $b$ of any suitable construction, which may be actuated from the drive-shaft C by suitable gearing, this drive-shaft C being actuated by bevel-gears $c$ $c'$, the latter of which is on the upper end of a vertical shaft $c^2$, which is mounted in suitable brackets attached to the frame of the machine, through which the axle D passes. This shaft $c^2$ has a vertically-adjustable guide $c^3$, which is splined to the shaft $c^2$ and can be adjusted longitudinally thereof by suitable means, substantially as indicated in the drawings. The gear $c$ meshes with a multiple bevel-geared disk D' on the axle D, and by adjusting gear $c$ radially of or over the disk D' the speed at which the drive-shaft C is operated can be varied.

The seed delivered from the cups $b$ passes through the spouts $d$ into the seed-boots E, which are connected to the furrow-openers F. These furrow-openers and the boots may be raised and lowered by suitable mechanism. (Indicated in the drawings.)

The axle D is rotated by the driving and supporting wheels $D^2$, as usual, said axle also supporting the frame. The parts thus far described may be of usual and known constructions and do not need further detailed explanation herein.

In rear of the shoes F is a bar G, which is connected to the frame by rods G'. On this bar are secured yokes $g$, to which are pivoted bell-crank levers $g'$, in the bends of which are journaled presser or covering wheels $g^2$, which track after the furrow-openers F and are adapted to yieldingly press the earth into the furrows.

The presser-wheels $g^2$ may be yieldingly pressed down in contact with the earth by means of springs $g^4$, mounted on rods $g^5$, interposed between an arm $g^6$ on the yoke $g$ and the rear arm of the bracket, as indicated in Fig. 1 of the drawings. This particular arrangement and construction of presser-wheels is not claimed herein, except in combination, and further detailed description thereof is unnecessary.

H designates a supplemental hopper forming part of the present invention. This hopper may be supported upon the frame of the machine and is preferably hung upon the forward side of the hopper B by means of eyes $h$, engaging hooks $h'$ on the said hopper, as shown. This supplemental hopper is provided with any desired number of seed-feeding devices located at suitable distances apart. The number of these feed devices might be determined by the closeness of the rows of any of the various seeds which are to be planted by the machine. I have indicated but four feed devices in the drawings; but I do not restrict myself to the use of any such number. There may be one such feed device for every feed device $b$ in the main hopper B or for every furrow-opener F in the drill. The construction of these supplemental feed devices is more clearly shown in Figs. 6 to 9. Each comprises a bottom plate I, having a central pocket $i$, provided with a tubular boss $i'$, on which is journaled a small bevel-gear J, which meshes with a bevel-gear J', which is journaled in a bracket $I^2$, Fig. 2, depending from the plate I beside and below the depression $i$. This gear J' has an angular bore, by which it is fitted on an angular shaft K, which is provided with a sprocket K', driven by a sprocket-belt $K^2$ from a sprocket $C^2$ on the driving-shaft C, as shown in the drawings. Thus the same drive mechanism which actuates the main-hopper feed is also used to actuate the supplemental-hopper feed. The gear J, as shown, is provided with diametrically-opposed lugs $j$ on its upper face, which are adapted to engage with recesses or openings $m$ in a feed plate or ring M, which lies within a circular recess in the upper part of plate I and is provided with peripheral openings $m'$, adapted to receive the seed. This plate or ring M is especially designed for feeding corn and other large seeds, and where smaller seeds are to be sown I preferably use the hollow or bowl-shaped plate or ring N, as shown in Fig. 11, which is provided with a number of minute perforations $n'$ near its periphery and with lugs $n^2$ on its under side to engage the lugs $j$.

The plate M may be rotatably centered on the stud $i'$ above the gear J, as indicated in the drawings, Fig. 9, and plate N may be similarly centered. While I have shown these seed-plates as of disk-like form, it will be observed that their contour may be changed and that they may be made annular or ring form, if desired, by simply omitting the central portions thereof, which central portions are covered by a central cap portion O' of a superimposed casting O, which is provided with a parti-circular channel or slot $O^2$, which permits the superimposed grain to enter the openings in the feed-plate. This slot is closed at one end by a pivoted dog or scraper P, which bears upon the surface of the seed-plate over the openings therein and is adapted to prevent any excess of grain passing out in the feed-openings of the plate. This dog is pressed down by a spring P', interposed between its heel and the plate I, as shown. After passing the dog P the grain is discharged from the feed-plate through an opening $i^3$ in the plate I, surrounded by a depending collar $I^4$, the grain being discharged into this opening by means of a weighted ejector Q, which is pivoted between the plates O and I, as shown. The plate O is preferably chambered to accommodate the dog and ejector, and as a matter of convenience it may be divided lengthwise of this chamber, and its rear part $o$ forms a complement of the plate O when the two are assembled together, as shown in the drawings. The ejector has laterally-projecting lugs $q$, which are engaged in recesses $o'$ in the adjacent under sides of the plates O $o$.

The seed is conducted from the opening $i^3$ through a tube $I^5$ into the related pipe $d$, as indicated in Fig. 1. It is then led to the tubes E of the furrow-openers. The tubes $I^5$ may be detachably connected to the plate I and collars $I^4$ by means of a thimble or funnel $I^7$ on the upper end, adapted to loosely fit the collar $I^4$, said funnel having a projecting hook $i^5$, which is adapted to catch over a flange $I^6$ at the back of the plate I, as indicated in the drawings, (see Figs. 8 and 9,) and thus detachably but securely suspend the tube $I^5$ in place.

By moving the bevel-gear $c$ toward or from the axle D the speed at which the feed-shaft will be driven can be varied, and this enables me to use the same feed plates or rings for quite a variety of seed and yet deposit the proper number of seed at the desired distance apart. By a slow speed they will be deposited a farther distance apart, and yet at a high speed they may be put near together or practically sown. I furthermore can collect any desired number of seed and drop them simultaneously to form "hills" by the following means:

To the lower end of the seed-boot E is pivoted a valve or cut-off R, which is provided with a tongue R', adapted to enter and close the tube, and said valve is provided with a pin $r$ on its upper end above its pivot, which is connected by a rod $r'$ to a crank-arm $r^2$ on a rock-shaft S, suitably journaled on the frame of the machine. This rock-shaft can be rocked at the proper time by any suitable means. As shown, I preferably employ a check-rower-tripping device or fork-arm T, which may be of any suitable construction and is not specifically claimed herein, and therefore need not be described in detail, said check-rower device being tripped at the proper times and in the usual manner by knots on the check-row wire $t$. I prefer to use the check-rower-tripping device when the machine is used for sowing corn in hills; but I do not wish to restrict myself to the employment of a check-rower for operating the cut-offs nor to the specific construction of cut-offs herein shown.

From the foregoing description it will be understood that when my attachment is applied to a regular grain-drill the frame, wheels, tongue, furrow-openers, and, in fact, practically all parts of the regular grain-drill can be used. I have shown in the drawings a grain-drill having sliding or share furrow-openers; but my improvements are equally useful where disk furrow-openers are employed. These drills ordinarily contain quite a number of furrow-openers, the larger sizes having as many as nineteen disks or furrow-openers about seven inches apart, and the attachment for such a machine as this might contain as many seed-feeders as there are furrow-openers in the grain-drill. However, the attachment may be made with a fewer number of seed-feeders, and in such case when the attachment is to be used they may be equally distributed along the length of the machine, and the intermediate furrow-openers can be removed. For instance, in planting corn with my attachment when used on a grain-drill having nineteen furrow-openers and drills I might use the supplemental feeds with the first, seventh, thirteenth, and nineteenth furrow-openers, removing all intervening furrow-openers unless it is desired to use them to fertilize or simultaneously plant other seed intermediate those planted from the supplementary hopper.

By the described driving arrangement of the feed of the supplemental hopper the speed of the seed-plates therein can be readily adjusted fast or slow by merely shifting the gear $c$ into engagement with different concentric rows of cogs on the gear D', and by this means more or less seed may be drilled from the supplementary hopper without the necessity of changing the feed-plates.

An advantage of this invention in planting corn is that the several furrow-openers are independent and each is permitted a limited amount of vertical play sufficient to insure regular depth of planting. It will be observed also that my improved attachment can be conveniently taken off and put on the ordinary drill and that farmers having this improvement will not be compelled to store so much machinery and will have a machine of great capacity at comparatively small expense, and the arrangement shown will allow fertilizers to be used in planting corn if the attachment is applied to a fertilizer-drill, and this attachment can be put onto the drills now in use.

In planting certain kinds of seed it is desirable to cover and press the earth over the furrows, and the presser-wheels $q^2$, as shown in Fig. 1, are very useful for this purpose. Of course in the complete drill one of such presser-wheels is provided for every furrow-opener, and if any furrow-openers are removed the corresponding presser-wheels should be removed.

While I prefer to drive each supplemental hopper-feed device by individual gearing, as indicated in the drawings, I do not restrict myself thereto, except where specifically mentioned in the claims. With extra long drills the driving-axle is sometimes made in two sections arranged in alinement, and hence two variable-speed gears would be required, one on each axle-section, and obviously two or more supplemental hoppers may be employed, if desired. When the attachment is taken off, the supplementary hopper is removed, likewise the check-rower device and the complete furrow-runner, although it would be possible to construct a furrow-runner so that only the dropping-valve and the lateral and main driving-rods, which control the dropping-valves, would have to be removed—that is, where the furrow-opener is the common one used with the ordinary grain-drill.

Where in this specification I have used the terms "feed plates or rings" I desire it understood that such expressions and terms are employed to define the invention more particularly as pertaining to a device or construction wherein a planter-feed is employed as distinguished from a grain-drill feed or a grass-seed feed, and in this particular I desire it understood that the said terms are not employed for the purpose of limiting the invention to any particular type of planter seed-feed, but, as has been stated, for the purpose of distinguishing it from such other type of feed, as above mentioned.

I have not shown the grain-drill complete in the drawings; but it is to be understood that the drill may be of any of the well-known forms of drills having the disks or furrow-openers on each tube, and in this connection it will be observed that one of the advantages of the present invention is that while the grain is being planted or positioned in the ground manifestly the disks or openers not otherwise employed can be used for disking or breaking up the ground between the rows of corn.

Having thus described my invention, what I therefore claim as new, and desire to secure by Letters Patent thereon, is—

1. In a grain-drilling machine, the combination with drilling instrumentalities, of an independent planter associated with and located adjacent the hopper, having a series of independent feed plates or rings operated by the drill-actuating means, means for conducting seed from the planter, and means for planting the seed in hills a distance apart.

2. In a grain-drill, the combination with drilling mechanism comprising a plurality of feeds, boots and soil-openers, of an independent planter associated with and adjacent the drilling mechanism and actuated by the drill-actuating means, a series of independent feeding devices in the planter less in number than the feeding devices of the drill, means for actuating the planter-feeds, and mechanism for depositing the seeds from the planter in hill form, substantially as described.

3. In a grain-drilling machine, the combination with the drilling instrumentalities, of an independent seed-planter associated with and located adjacent the hopper, a series of independent feeding means for actuating the said planter-feeding means connected with the drill-actuating means, and means for collecting and depositing seeds from the planter in hill form.

4. In a grain-drilling machine, the combination with a series of furrow-openers, a grain-hopper, feed-tubes leading from the hopper to the openers, of an independent planter attachment located adjacent the grain-hopper, a series of independent feeding devices for the planter attachment to the openers, independent means for actuating the feeding devices, and a check-row attachment for regulating the discharge of the material from the planter attachment.

5. In a grain-drilling machine, the combination with drilling instrumentalities, of an independent corn-planter attachment comprising a hopper located adjacent the drill-hopper, and a series of independent feed-plates, of a series of independent means for actuating the plates operatively associated with the drill-actuating mechanism, and a check-row mechanism for depositing the seeds in hill form.

6. In a drilling-machine, the combination with a series of furrow-openers and drilling instrumentalities comprising a hopper, and feeding-tubes, of an independent planter attachment located adjacent the hopper, having an independent series of feed devices actuated by the drill-actuating mechanism, and seed-conducting tubes less in number than the seed-conducting tubes of the drill whereby the seeds from the planter are deposited at distances apart greater than the distance of the rows deposited by the drill.

7. In a grain-drilling machine, the combination with furrow-openers in number corresponding with the number of feed-tubes in the drill-machine, of an independent planter attachment adjacent thereto having a series of independent feed plates or rings and feed-tubes leading to the openers less in number than that of the drill, and means actuated by the drill-actuating mechanism for actuating the feeding devices of the planter attachment to cause the seed therefrom to be discharged into the tubes.

8. In a grain-drilling machine, the combination with drilling instrumentalities comprising furrow-openers and feed-tubes, of an independent planter attachment located adjacent the hopper, actuated by the drill-actuating means and comprising a series of independently-operated feeding plates or rings, and a check-row mechanism for governing the feed of the planter attachment.

9. In a grain-drill, the combination with a seed-hopper having feeding mechanism, and means for actuating said mechanism, of a supplemental independent planter-hopper adjacent the drill-hopper having a series of independent feeding devices less in number than those of the drill and independent connecting-gearing for driving said feeding mechanisms.

10. In a grain-drill, the combination with drilling mechanism, of a planter attachment therefor, arranged adjacent the drill-hopper and having a series of feeds to discharge the seeds in rows a distance apart greater than those of the drill-discharge operable independent of the drill, and connecting-gearing for operating the planter independently of the drilling mechanism.

11. In a grain-drill, the combination with feed-operating mechanism, of a separate adjacently-located planter mechanism having a series of independent feeds separated a distance different from those of the drill, and a plurality of connecting mechanism for operating the planter-feed mechanism through the drill-feeding mechanism.

12. In a grain-drill, the combination with drilling instrumentalities, of a separate supplemental seed-receptacle adjacent the drill-hopper, a series of independent feeding mechanism for said receptacle differing in number from the feeding mechanism of the drilling instrumentalities, and associated mechanism for operating the feeds, substantially as described.

13. In a grain-drill, the combination with drilling instrumentalities, of a corn-planter attachment located adjacent the drill-hopper, a plurality of independent connecting mechanism between the actuating mechanisms for the drilling and planter attachment, and independent rotary feeding devices in the planter attachment.

14. In a grain-drill, the combination with drilling instrumentalities comprising seed-conducting tubes, of an independent planter attachment adjacent the hopper having a less number of discharges than the drill and entering certain drill-tubes, boots at the ends of the tubes, a series of independent feeding devices for the planter, and means for moving certain boots out of active position.

15. In a grain-drill, the combination with drilling instrumentalities, of a planter attachment for the drill comprising a hopper located adjacent the drill-hopper, and a series of independent feeding means, connected mechanism for actuating the planter-attachment feed independently of the drill-feed, and adjustable gearing for varying the speed of the planter-feed mechanism.

16. In a grain-drill, the combination with drilling instrumentalities, of a planter-hopper adjacently located having a series of independent feeding devices less in number than the feeding devices of the drill, means for connecting the feed of the planter with the tubes of the drill, and means for elevating the furrow-opening parts of the drilling instrumentalities independent of the planter-feed.

17. In a planter, the combination with a supporting-plate having a circular cavity therein, a feed-plate located in the cavity, a divided casting supported on the supporting-plate above the feed-plate, a bolt passing through the plates and securing the parts of the casting in place the said parts of the casting having adjacent recesses, an ejector pivotally secured in the said recesses of the casting, a groove in one part of the casting, and a spring-pressed dog in the groove all of the parts being retained in place by the said bolt.

18. The combination with the frame, of a planter-hopper provided with a plate having a recess provided with a central upstanding tubular stud, a bevel-gear journaled on said stud, a second bevel-gear meshing with the first gear and supported below the plate, a feed ring or plate actuated by the first bevel-gear and rotating in said recess, a pair of castings attached to the plate above the feed-plate, one of said castings having a projection covering the central portion of the feed-plate, and also having a parti-circular opening to permit seed to pass to the apertures in the feed-plate, a spring-actuated clearer at one end of the slot, and a gravity seed-ejector confined between the castings and the seed-plate, substantially as described.

19. In a drill, the combination with a planter-hopper, a feed device therein having a discharge-opening surrounded by a collar, means for actuating said feed device, a seed-conducting pipe, and a collar or funnel attached to the upper end of said pipe adapted to loosely engage the flange around the discharge-opening and provided with a hook adapted to engage the plate and detachably connect the feed-pipe thereto, substantially as described.

20. In a grain-drill the combination with drilling instrumentalities, of an adjacent planter attachment comprising a series of independent feeds, but of a number less than the drill feeds and conductors from the planter-feeds to the furrow-openers of the drill.

21. In a grain-drill, the combination with drilling instrumentalities, of an adjacent planter attachment having feeds less in number than the drill-feeds, said planter-feeds consisting of a series of independently-actuated horizontally-rotatable plates, and conductors from the planter-feeds to the drill-furrow openers.

22. In a grain-drill, the combination with the drilling instrumentalities comprising openers, of a planter attachment located adjacent the drill-hopper and provided with a plurality of separated independently-operated feed devices, less in number than the feeds of the drill, means for conducting the seeds from the planter to the openers, and means for depositing the feeds from the planter in hills.

23. In a grain-drilling machine, the combination with drilling instrumentalities, of an adjacent planter attachment provided with a series of horizontally-rotatable feeding devices having provisions for separating and discharging a given number of seeds, conducting-tubes to the furrow-openers of the drill, and means for depositing the seeds in hills a distance apart.

24. In a grain-drilling machine, the combination with drilling instrumentalities, of a planter attachment adjacent the drill-hopper, and provided with a series of horizontally-rotatable feeding plates or rings formed to discharge a given number of seeds from the planter-hopper, said planter-feeds being less in number than those of the drill and conducting-tubes leading from the planter attachment to the furrow-openers of the drill.

25. In a grain-drilling machine, the combination with drilling instrumentalities, of a planter attachment adjacent the drill-hopper, and provided with a series of horizontally-rotatable feeding plates or rings formed to discharge a given number of seeds from the planter-hopper, and connected mechanism for the feeds of the drill and planter.

26. In a planter-feeding mechanism, the combination with a casting having an upturned flange part, a feed-plate mounted in the casting, a conducting-tube having at one side an upward extension formed with a return-bend constituting a hook part taking over said flange part of the casting, and a depending tubular extension on the casting communicating with the conducting-tube.

27. In a grain-drill and in combination, drilling instrumentalities, an independent planter associated with and located adjacent to the hopper of the drill and operated by independent gearing actuated by the feed-actuating gearing, and means for changing the gear to cause the planter-feeds to rotate at different speeds, said planter-feeds being less in number than the drill-feeds.

28. In a grain-drill and in combination with drilling mechanism having a plurality of feeds, conducting-tubes and furrow-openers, of adjustable mechanism for variably actuating the feeds of the drill, an independent planter adjacent the hopper of the drill and having a series of feeding devices therein, and independent connections between the drilling-actuating devices and the planter-feed-actuating devices.

29. In a drilling-machine and in combination with drilling instrumentalities, of an independent corn-planter attachment comprising a hopper extending across the machine and located adjacent the drill-hopper, independent feed plates or rings in the planter-hopper, independent means for actuating the plates or rings operatively associated with the drill-actuating mechanism, and a check-row attachment for the machine.

30. In a grain-drill and in combination with the drilling instrumentalities, of a corn-planter attachment adjacent the hopper of the drill, said attachment being provided with a series of horizontally-arranged feeding members provided with cells or the like, for separating and distributing one or more seed at a time from the planter said planter-feeds being less in number than the drill-feeds and having independent operating connections with the drill-operating mechanism.

31. In a grain-drilling machine and in combination with drilling instrumentalities, of a corn-planter attachment adjacent the hopper of the drill and having a series of independently-actuated feeding plates or rings less in number than the number of feeds of the drill, and the said drill being provided with a series of furrow-openers the widely-separated members of which are employed for the planter attachment.

32. In a grain-drill and in combination with drilling instrumentalities, of means for actuating the said drilling instrumentalities, of a supplemental planter-hopper adjacent to the drill-hopper, independent means actuated by the drill-feed-actuating mechanism for actuating the planter mechanism, a valve for collecting seeds from the planter, and a check-row attachment for actuating said valve.

33. In a grain-drill the combination with the carrying wheels and frame, of a planter attachment arranged adjacent the drill-hopper and comprising a series of independently-operated feeding devices, valves for collecting the seed from the planter-feeds, and a check-row attachment for actuating the valves.

34. In a grain-drill the combination with a seed-hopper having feeding mechanism, and means for actuating the said mechanism, of a supplemental planter-hopper adjacent to the drill-hopper having a series of feeding devices less in number than those of the drill, connecting-gearing for driving said feeding mechanism, and a check-row attachment for the planter.

35. In a grain-drill, the combination with a seed-hopper having feeding mechanism, and means for actuating said mechanism, of a supplemental planter-hopper adjacent the drill-hopper having a series of feed devices less in number than those of the drill, and a changeable-gear connection for driving the said feeding mechanism.

36. In a grain-drill the combination with a seed-hopper having feeding mechanism, and means for actuating said mechanism, of a supplemental planter-hopper adjacent the drill-hopper extending across the machine and having a series of feeding devices less in number than those of the drill, and connecting-gearing for driving said feeding mechanism.

37. In a grain-drilling machine, the combination with drilling instrumentalities, of an independent planter associated with and located adjacent the hopper of the drill and operated by the drill-actuating means, means for feeding seed from the planter, and a check-row device for depositing the seeds in hills a distance apart.

38. In a grain-drilling machine, the combination with drilling instrumentalities, of an independent planter associated with and located adjacent to the hopper of the drill, means for feeding seed from the planter comprising an independent series of feeding devices, and a sprocket connection from the grain-drill-feed mechanism to the planter-feeding devices.

In testimony that I claim the foregoing as my own I affix my signature in presence of two witnesses.

WILLIAM FETZER.

In presence of—
R. C. ZECHER,
G. A. SULLIVAN.